United States Patent
Falk

(10) Patent No.: US 7,785,014 B2
(45) Date of Patent: Aug. 31, 2010

(54) SEALED BEARING

(75) Inventor: Johan Falk, Mölndal (SE)

(73) Assignee: Aktiebolaget SKF, Göteborg (SE)

( * ) Notice: Subject to any disclaimer, the term of this patent is extended or adjusted under 35 U.S.C. 154(b) by 619 days.

(21) Appl. No.: 11/662,062

(22) PCT Filed: Jul. 7, 2005

(86) PCT No.: PCT/SE2005/001126

§ 371 (c)(1),
(2), (4) Date: Apr. 30, 2007

(87) PCT Pub. No.: WO2006/019347

PCT Pub. Date: Feb. 23, 2006

(65) Prior Publication Data

US 2007/0292065 A1 Dec. 20, 2007

(30) Foreign Application Priority Data

Aug. 19, 2004 (SE) .................................. 0402046

(51) Int. Cl.
*F16C 33/76* (2006.01)
*F16J 15/02* (2006.01)

(52) U.S. Cl. .................. 384/477; 384/484; 384/495; 277/345; 277/637; 277/641

(58) Field of Classification Search .................. 384/153, 384/204, 486, 477, 558, 537, 569, 484, 495; 277/399, 402–403, 573–575, 636–637, 650, 277/345, 641; 403/37, 50, 140, 223

See application file for complete search history.

(56) References Cited

U.S. PATENT DOCUMENTS 3,203,740 A * 8/1965 Peickii et al. ............... 384/486
3,519,316 A * 7/1970 Gothberg .................... 384/486
3,700,297 A * 10/1972 Fickenwirth et al. ........ 384/477

(Continued)

FOREIGN PATENT DOCUMENTS

EP 0 453 421 B1 7/1994

OTHER PUBLICATIONS

International Search Report dated Oct. 31, 2005.

(Continued)

*Primary Examiner*—Marcus Charles
(74) *Attorney, Agent, or Firm*—Buchanan Ingersoll & Rooney PC

(57) ABSTRACT

A sealed, self-aligning bearing includes an inner bearing ring with race tracks for rolling bodies, and an outer bearing ring with a race track for the rolling bodies, positioned radially outside the inner bearing ring. At least at one side of the bearing, a bearing seal is arranged axially outside the race tracks and bridges the space between the inner and outer bearing rings. The bearing seal has an outer annular rim fitted in an annular groove in the inner surface of the outer bearing ring and an inner annular rim arranged to slidingly contact the outer surface of the inner bearing ring. The outer rim and the inner rim of the bearing seal are interconnected by an intermediate member formed as a bellows-like thin membrane able to alternatively be stretched and compressed for permitting the bearing rings of the self-aligning bearing to make displacements and/or angular misalignments.

12 Claims, 1 Drawing Sheet

U.S. PATENT DOCUMENTS

Figure 1:
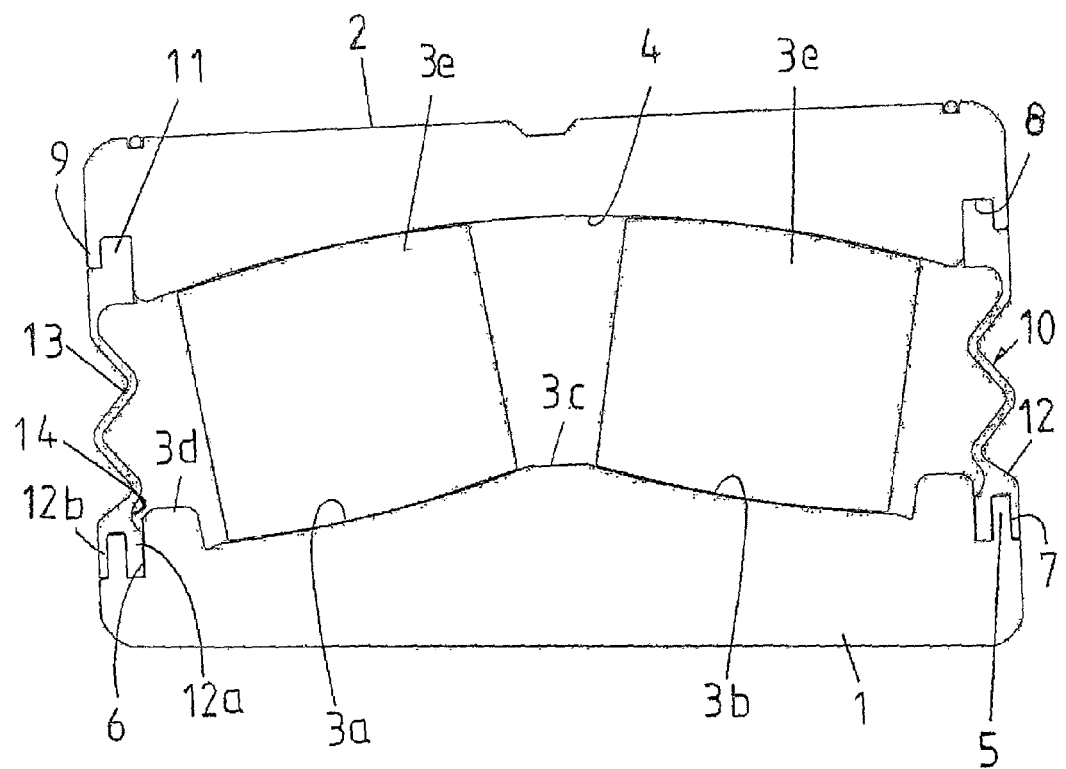

| | | | | |
|---|---|---|---|---|
| 3,810,636 | A | * | 5/1974 | Gorski .................. 277/369 |
| 3,814,446 | A | | 6/1974 | Derman |
| 4,034,996 | A | * | 7/1977 | Manita et al. ............ 384/203 |
| 4,309,063 | A | * | 1/1982 | Weis .................... 384/482 |
| 4,872,770 | A | * | 10/1989 | Dickinson .............. 384/484 |
| 5,006,376 | A | * | 4/1991 | Arima et al. ............ 277/636 |
| 5,119,446 | A | | 6/1992 | Grafström et al. |
| 5,364,191 | A | * | 11/1994 | Gruber .................. 384/203 |
| 5,725,433 | A | * | 3/1998 | Kudo et al. ............ 464/175 |

OTHER PUBLICATIONS

Written Opinion of the international Searching Authority dated Oct. 31, 2005.

* cited by examiner

SEALED BEARING

TECHNICAL FIELD

The present invention relates to a sealed bearing, and particularly a large bearing having an ability to accommodate angular misalignment and possibly also axial displacement of the two bearing rings relative to each other.

BACKGROUND DISCUSSION

Bearings, which are sealed off are today used in many applications. At bearings having small or no angular misalignments at all, the seal will function in an appropriate manner. A large number of different solutions are available on the market for this type of bearings. The size of the bearing is of less importance in this regard.

Regarding spherical bearings and other self-aligning bearings, there are however problems as these bearings are made for handling large angular misaligments. For using seals in those types of bearings it is necessary to compromise. Such compromises can be to make a sphered surface on the inner ring against which the seal engages, to reduce the contact angle, which has influence on the load carrying and/or to restrict the ability of the bearing to make angular motions. A typical maximum misalignment for a sealed off spherical roller bearing is 0.5°.

It is of course not a good solution to provide a self-aligning bearing with built in seals, which highly reduce the ability of the bearing to make angular adjustments.

SUMMARY

The purpose of the present invention is to propose a seal which functions well with large self-aligning bearings allowing large angular misalignments and also large axial displacements between the bearing rings. Thus, the bearing shall be able to cope with alignments up to 1.5° and axial displacements corresponding to C4 clearance, with intact internal bearing geometry.

BRIEF DESCRIPTION OF THE DRAWING FIGURE

Hereinafter the invention will be further described with reference to a non-limiting embodiment illustrated in the accompanying drawing.

FIG. 1 shows in a simplified view a portion of a double-row spherical roller bearing with a seal in accordance with the present invention.

DETAILED DESCRIPTION

FIG. 1 shows the contours of a portion of a double row spherical roller bearing, with a portion of an inner bearing ring 1 and a portion of an outer bearing ring 2. The outer envelope surface of the inner bearing ring 1 is equipped with two sphered racetracks 3a, 3b for two rows of rolling bodies 3e. The two race tracks 3a, 3b are spaced apart by a planar intermediate land 3c, and are limited at their ends facing away from the land 3c by one integral guide flange 3d, each. The outer bearing ring 2 is provided with one sphered inner surface 4 forming a race track for both rows of the rolling bodies, thus allowing the outer bearing ring 2 to make angular movements, and also small axial movements, relative to the inner bearing ring 1 under operation.

On each side of the inner bearing ring 1, outside the two guide flanges 3d, is provided a radially outwardly projecting ridge 5, which is spaced apart from the adjacent guide flange 3d by a short gap 6, and which is retracted a small distance 7 from the adjacent side face of the inner bearing ring 1.

At each axial side of the inner surface of the outer bearing ring 2, outside the sphered surface 4, is provided an annular groove 8, with an axially outer, short radially projecting flange 9.

Each side of the bearing is sealed off by means of a seal 10, which seal is each made as an one-piece homogeneous component, from a material, which is soft as compared to the material in the bearing rings. Such materials can be rubber or any suitable type of plastic material. This means that the production costs can be kept low in comparison to conventional bearing seals, which are often composed of components of different material (rubber and metallic reinforcements).

Although shown and described with the bearing seal 10 according to the invention fitted at both sides of the self-aligning bearing, it is of course possible to have only one axial side of the bearing sealed off by such a seal.

The outer rim of the seal 10 is made with a thick body 11, having a shape and size resembling to the annular groove 8 in the outer bearing ring 2, whereby the outer rim of the seal 10 can be easily fitted in the groove 8 by a snap-in action or by interference fit, thereby eliminating need of complex mounting tools.

The inner rim 12 of the annular seal 10 is shaped as a fork 12 straddling the projecting ridge 5 on the inner bearing ring 1. The fork-like portion has two shanks, a first one 12a having a size and form resembling to that of the gap 6 and the other 12b having an axial extension resembling to the distance 7, with which the ridge 5 is retracted from the side face of the bearing ring. Thus the inner rim of the seal will slide against the axial sides of the ridge 5 on the inner bearing ring, but a clearance will be at hand between the top of the ridge 5 and the inner rim 12 of the seal, and this sliding fork-shaped surface will act for centering itself about the ridge 5.

The outer rim 11 and the inner rim 12 of the seal 10 are interconnected by a bellows-like intermediate membrane 13 bridging the space between the inner bearing ring 1 and the outer bearing ring 2, when the seal has been mounted in the bearing.

Due to the fact that the outer rim 11 of the seal is mounted in a rigid manner in the groove 8 in the outer bearing ring, the inner rim 12 is arranged to slidingly straddle the ridge 5 projecting from the inner bearing ring, and the intermediate membrane 13 between the inner and outer rims is designed as a bellows, the inner rim and the outer rim of the seal 10 will act independent of each other regarding axial and radial displacements and misalignments. The tolerances for the sliding surface of the ridge 5 can be wider than the tolerances of a spherical surface, which must be close for permitting a sealing function of the spherical surface.

The bellows-like membrane will make the bearing insensitive to axial and radial displacements and misalignments in a manner, which is not known from, sealed off earlier spherical bearings available on the market.

At the transition between the inner rim 12 and the bellows-like membrane 13, there is provided a recessed portion 14 at the inner side of the seal. This recess 14 will permit larger misalignments without the risk that the seal and the inner bearing ring will contact each other.

At misalignment or axial displacement between the inner bearing ring 1 and the outer bearing ring 2 during operation, the intermediate bellows-like membrane 13 of the seal 10 will move in order to compensate this misalignment and/or displacement, thus the bellow-like membrane 13 will be stretched out on the seal 10 at one side of the bearing, whereas the membrane 13 on the seal 10 at the opposite side of the bearing is compressed thus that space between the folds of the bellows-like membrane 13 is reduced.

With this function it is even possible that spherical rollers positioned between the inner and outer bearing rings at extreme misalignments/displacements at one side of the bearing can move outside the side face of the outer bearing ring 2. This is a normal behaviour for a spherical bearing having no integral seals, but it is not possible for spherical bearings having integral seals of the earlier used type, as those earlier, often stiff seals will prevent the bearing rings from making other than small motions radially, axially and angularly relative to each other.

At the outer rim 11 of the seal 10, the soft seal is inserted in a harder material, i.e. the material of the bearing ring, whereby the outer rim portion is compressed thereby forming a rigid connection between the seal and the groove 8 in the outer bearing ring 2.

At the inner ring 1 it is so that it instead is the softer material, such as rubber or the like, which straddles the harder material (steel) of the ridge 5, and this leads to a comparatively low friction and with not shown grooves in the portion of the seal straddling the ridge, and lubricating grease positioned therein, will further reduce the friction at the same time as a good sealing effect is achieved with a maintained ability of absorbing misalignments of a size of about 1.5° and comparatively large radial and axial displacements.

The invention is not limited to the embodiment illustrated in the drawing and described with reference thereto, but modifications and variants are possible within the scope of the attached claims.

Thus the bearing has been illustrated in the drawing and described with reference thereto as a double-row spherical roller bearing, but it can of course also be other self-aligning bearings, such as for instance a toroidal roller bearing.

The invention claimed is:

1. A sealed, self-aligning bearing comprising:
   an inner bearing ring with race tracks for rolling bodies, the inner bearing being rotatable about an axis;
   an outer bearing ring with a race track for the rolling bodies, the outer bearing ring being positioned radially outside the inner bearing ring;
   a bearing seal at least at one side of the bearing, the bearing seal being arranged axially outside the race tracks of the inner bearing ring and the race track of the outer bearing ring, the bearing seal bridging a space between the inner and outer bearing rings;
   the bearing seal comprising an outer annular rim fitted in an annular groove in an inner surface of the outer bearing ring and an inner annular rim arranged to slidingly contact an outer surface of the inner bearing ring, wherein the outer bearing ring is non-rotatable relative to the outer rim;
   the outer rim and the inner rim of the bearing seal being interconnected by an intermediate member;
   the intermediate member interconnecting the outer rim and the inner rim of the bearing seal being a thin membrane configured as a bellows to alternatively be stretched and compressed to permit the inner and outer bearing rings of the self-aligning bearing to make displacements and/or angular misalignments;
   the inner bearing ring adjacent each one of its axial end faces comprising a circumferential radially outwardly projecting ridge which is retracted a distance axially from an adjacent side face of the inner bearing ring; and
   the inner rim of the bearing seal being configured as a fork with first and second axially spaced apart and inwardly extending shanks arranged to sealingly straddle the outwardly projecting ridge, wherein the inner bearing ring is rotatable relative to the inner rim of the bearing seal about said axis.

2. A sealed bearing as claimed in claim 1, wherein the outer rim, the inner rim and the intermediate membrane are all made as an integral homogenous body.

3. A sealed bearing as claimed in claim 2, wherein a side of the bearing seal facing an interior of the bearing, at a junction between the inner rim of the bearing seal and the intermediate membrane, is provided with a recess permitting larger misalignments without risk that the seal and the inner bearing ring will contact each other.

4. A sealed bearing as claimed in claim 3, wherein the annular groove in the inner surface of the outer bearing ring, outside the race track of the outer bearing ring, has an axially outer short radial flange so that the groove possesses a countersunk shape allowing the outer rim of the bearing seal to be snapped or pressed in to a rigid connection with the outer bearing ring.

5. A sealed bearing as claimed in claim 2, wherein the annular groove in the inner surface of the outer bearing ring, outside the race track of the outer bearing ring, has an axially outer short radial flange so that the groove possesses a countersunk shape allowing the outer rim of the bearing seal to be snapped or pressed into a rigid connection with the outer bearing ring.

6. A sealed bearing as claimed in claim 1, wherein the second shank has a width corresponding to an axial distance that the ridge is retracted from the side face of the inner bearing ring.

7. A sealed bearing as claimed in claim 6, wherein the annular groove in the inner surface of the outer bearing ring, outside the race track of the outer bearing ring, has an axially outer short radial flange so that the groove possesses a countersunk shape allowing the outer rim of the bearing seal to be snapped or pressed into a rigid connection with the outer bearing ring.

8. A sealed bearing as claimed in claim 6, wherein a side of the bearing seal facing an interior of the bearing, at a junction between the inner rim of the bearing seal and the intermediate membrane, is provided with a recess permitting larger misalignments without risk that the seal and the inner bearing ring will contact each other.

9. A sealed bearing as claimed in claim 8, wherein the annular groove in the inner surface of the outer bearing ring, outside the race track of the outer bearing ring, has an axially outer short radial flange so that the groove possesses a countersunk shape allowing the outer rim of the bearing seal to be snapped or pressed into a rigid connection with the outer bearing ring.

10. A sealed bearing as claimed in claim 1, wherein a side of the bearing seal facing an interior of the bearing, at a junction between the inner rim of the bearing seal and the intermediate membrane, is provided with a recess permitting larger misalignments without risk that the seal and the inner bearing ring will contact each other.

11. A sealed bearing as claimed in claim 10, wherein the annular groove in the inner surface of the outer bearing ring, outside the race track of the outer bearing ring, has an axially outer short radial flange so that the groove possesses a countersunk shape allowing the outer rim of the bearing seal to be snapped or pressed into a rigid connection with the outer bearing ring.

12. A sealed bearing as claimed in claim 1, wherein the annular groove in the inner surface of the outer bearing ring, outside the race track of the outer bearing ring, has an axially outer short radial flange so that the groove possesses a countersunk shape allowing the outer rim of the bearing seal to be snapped or pressed into a rigid connection with the outer bearing ring.

* * * * *